July 29, 1958 H. NELSON 2,845,373

SEMI-CONDUCTOR DEVICES AND METHODS OF MAKING SAME

Filed June 1, 1954

INVENTOR.
HERBERT NELSON
BY
J. L. Whittaker
ATTORNEY 2,845,373

SEMI-CONDUCTOR DEVICES AND METHODS OF MAKING SAME

Herbert Nelson, Princeton, N. J., assignor to Radio Corporation of America, a corporation of Delaware Application June 1, 1954, Serial No. 433,351

8 Claims. (Cl. 148—1.5)

This invention relates to improved semi-conductor devices and methods of making them. More particularly it relates to improved semi-conductor devices of the alloy junction type that include bodies of crystalline semi-conductive silicon or alloys of silicon.

To make a so-called alloy junction type semi-conductor device, generally a selected impurity material is surface alloyed to a semi-conductor body to form a rectifying barrier therein. The body is of one conductivity type, n or p, and the impurity material is usually selected from among those elements that are capable of imparting the opposite type conductivity, p or n, respectively, to the body, when dispersed therein.

Germanium and silicon are among the semi-conductive materials commonly used to make such devices. Although germanium is in more common use at present, silicon is a preferred material for many devices because it retains its semi-conductive character when heated to relatively high temperatures. For example, many germanium semi-conductor devices lose their effectiveness at temperatures above about 80° C. while silicon devices are substantially unaffected by temperatures up to about 200° C. Silicon, however, and alloys comprising substantial proportions of silicon are metallurgically relatively difficult to handle. Silicon rapidly acquires a surface oxide film, for example, that is difficult to penetrate in a surface alloying process. Silicon also is relatively insoluble in some of the metals commonly used for surface alloying to germanium.

Little difficulty is encountered in surface alloying to germanium or to silicon and its alloys the materials capable of imparting p-type conductivity to these semi-conductors when diffused therein. The so-called p-type impurities are principally the elements of the boron group of the periodic table and with the exception of boron they are all relatively soft and plastic and dissolve germanium and silicon readily. They are, therefore, easily surface alloyed to germanium or to silicon.

Materials such as arsenic, antimony and bismuth that impart n-type conductivity to germanium and silicon, however, are generally crystalline and hard or brittle. Those that are plastic such as sulfur and tellurium are insulating so that they are unsuitable for use in many applications where it is desired to make an electrical contact to the surface alloyed material. It is often difficult successfully to surface alloy a hard or brittle material to semi-conductors such as germanium or silicon because these semi-conductors are also relatively hard and brittle. Due to differences in crystal structures and in physical properties such as thermal expansion, undesirable strains tend to develop between two hard crystalline materials when they are joined by surface alloying.

Methods have been previously devised to utilize relatively soft metals as impurity carriers when surface alloying to introduce n-type impurity materials into germanium or silicon. Commonly, lead is utilized as a carrier to introduce n-type impurities into germanium. Gold is commonly used as a carrier material with silicon because silicon is not soluble in lead. Gold, however, is not completely satisfactory as a surface alloying material with silicon and silicon alloys because it does not readily and evenly wet a silicon surface. An electrode of gold tends because of surface tension to contract during heating in the alloy process rather than to spread out over the surface to form a relatively broad and flat contact region. Further, during the alloy process, substantial proportions of silicon dissolve in the electrode material changing the composition of the electrode. Electrodes comprising principally gold and silicon are relatively hard and tend to develop undesirable strains which adversely affect the electrical properties of devices in which they are incorporated.

Accordingly, one object of the instant invention is to provide improved materials that may be alloyed to bodies of semi-conductive silicon and silicon alloys.

Another object is to provide improved materials that may be alloyed to semi-conductive silicon or silicon alloys to form devices including rectifying barriers.

Another object is to provide improved methods of making rectifying barriers in semi-conductor bodies of silicon and of alloys of silicon.

These and other objects are accomplished by the instant invention according to which it has now been discovered that improved devices may be produced by surface alloying to a silicon or silicon alloy semi-conductor body a mixture of lead and gold including a relatively small proportion of a conductivity type-determining impurity. The lead and the gold are preferably utilized as separate bodies, the impurity material being present in solution in one or the other. The admixture of the lead and gold is accomplished by heating them in the alloy process.

The invention will be described in greater detail in connection with the accompanying drawing of which:

Similar reference characters are applied to similar elements throughout the drawing.

Figure 1:
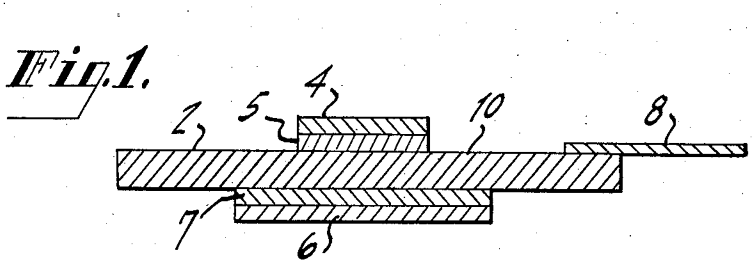
Figure 1 is a schematic, elevational, cross-sectional view of the constituent parts of a semi-conductor device before the alloy process according to the invention.

The drawing illustrates the production of an n-p-n silicon transistor according to a preferred embodiment of the invention. Referring now to Figure 1, a wafer 2 of p-type semi-conductive silicon is prepared by any known means to render it suitable for use in an alloy junction type device. A typical wafer consists of a single crystal of silicon and may be about 0.25" x 0.125" x .01" thick when initially cut from a relatively large ingot. The wafer is etched by immersion in an acid solution such as a mixture of hydrofluoric and nitric acids to reduce its thickness to about .004" and to expose a clean, crystallographically undisturbed surface.

A mixture, or solution of lead and arsenic consisting of about 98 wt. percent substantially pure lead and 2 wt. percent asenic is prepared by dissolving arsenic in molten lead in a non-oxidizing atmosphere and cooling the mixture. Two pellets 5 and 7 are cut from this mixture, immersed in hydrofluoric acid, dried and placed upon opposite sides of the wafer. The pellets may conveniently be discs about .005" thick and .010" and .025" in diameter respectively. They are immersed in the hydrofluoric acid to coat them with a fluoride salt film which decomposes upon heating to act as a flux. This treatment of the pellets is described and claimed in the co-pending application of H. Nelson, Serial No. 389,514, filed November 2, 1953.

Two gold pellets 4 and 6 similar in size to but about one-half as thick as the lead pellets are superimposed on the lead pellets. A tinned base tab 8 which may be of nickel is placed upon one surface 10 of the wafer. The ensemble is supported in any known jig such as the carbon boat described and claimed in the co-pending application of C. W. Mueller, Serial No. 295,304, filed June 24, 1952, and assigned to the same assignee as the instant application. The ensemble is heated at about 730° C. for about five minutes to melt the pellets and to alloy them to the wafer. Simultaneously the base tab is soldered to the wafer. Electrical leads 12 and 14, as shown in Figure 2, may be attached to the electrodes to complete the device which may then be conventionally etched, mounted and potted.

Figure 2:
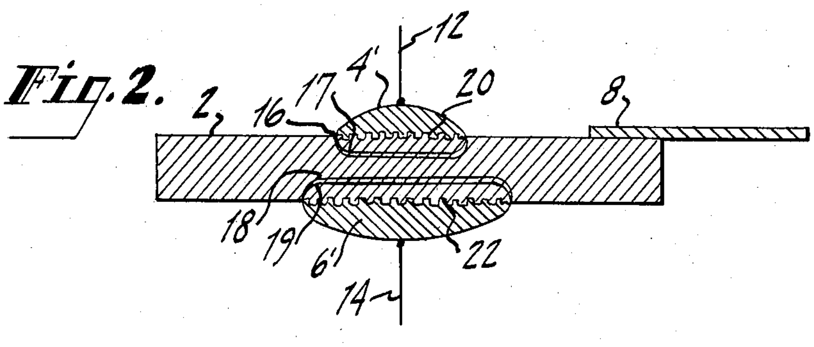
Figure 2 is a schematic, elevational, cross-sectional view of a completed device according to the invention.

The device thus produced is shown schematically in Figure 2. It consists of the base wafer 2, a base tab 8, two electrodes 4' and 6' formed from the lead and gold pellets, electrical leads 12 and 14 connected to the electrodes, and two p-n rectifying junctions 16 and 18 each associated with one of the electrodes. The surfaces 17 and 19 in the base wafer at the maximum depth of penetration of the electrodes into the wafer during the alloy process are called the alloy fronts. When the pellets are melted during the process they wet the wafer and dissolve respective surface portions thereof penetrating partially through the wafer towards each other. Upon freezing, part of the silicon dissolved in the pellets crystallizes back upon the wafer to form the recrystallized regions 20 and 22 respectively. Lead and gold have substantially no significant effect upon the conductivity type of the silicon and therefore the conductivity type of the recrystallized regions of the device is primarily controlled by the relatively small amount of arsenic included in the lead. The major portion of the wafer remains p-type while the recrystalilzed regions are converted to n-type conductivity by the inclusion of arsenic atoms. The p-n rectifying junctions 16 and 18 are formed adjacent to the alloy fronts. It is presently believed that these junctions are formed a few ten's of Angstroms deeper in the wafer than the alloy fronts due to the diffusion of arsenic atoms into the solid portion of the wafer beyond the alloy fronts.

The electrodes of the device consist principally of an alloy of lead, gold and silicon and are relatively soft compared to the electrodes of similar previous devices which consist principally of an alloy of gold, silicon and antimony. The addition of lead also lowers the melting point of the electrode composition and minimizes the thermal strains incurred in the alloy process itself because the temperature range through which the device is cooled after solidification of the electrodes is minimized.

Satisfactory results may also be obtained when the conductivity type-determining impurity is included in the gold rather than in the lead. It is preferred, however, to add the impurity initially in the lead because the commonly used impurities such as arsenic and antimony do not have a hardening effect upon lead as they do on gold. Electrode pellets are more readily formed from alloys of lead and arsenic or of lead and antimony than they are from alloys of gold and arsenic or gold and antimony.

Alternatively, the lead, gold and the impurity may all be alloyed together before they are surface alloyed to the silicon. Alloys of lead and gold including desired proportions of a selected impurity, however, are relatively brittle and difficult to work. It is difficult to form regularly shaped pellets from such alloys. Further, when making such an alloy it is difficult to insure a uniform composition throughout the entire mass of the alloy so that different pellets cut from the same mass will be uniform in composition with respect to one another. It is therefore preferred to utilize separate pellets of lead and of gold. These may be readily formed from lead and gold foil respectively.

Satisfactory results may also be accomplished if the gold instead of the lead is placed adjacent to the silicon surface. Reproducibility, however, is improved when the lead is placed adjacent to the silicon because the fluoride flux appears to be relatively important in producing good alloying results. The fluoride flux is more readily available for rapid contact to the silicon surface when it is placed immediately adjacent to the silicon surface than when it is separated therefrom by an intermediate layer of gold.

A further advantage of the practice of the invention is the control of the depth of penetration of the electrode into the silicon wafer. Previous electrodes consisting principally of gold and an admixed impurity penetrate relatively deeply into silicon wafers because of the relatively high degree of solubility of silicon in gold. The addition of lead to the electrode composition reduces the solubility of silicon in the electrode and therefore reduces the penetration of the electrode into the wafer during the alloy process.

The alloy process according to the invention may be carried out at any temperature within the range of about 500 to 900° C. At temperatures near the upper limit of this range the depth of penetration of the electrode material is primarily determined by the quantity of elecrode material utilized per unit area of contact surface and by the temperature. When the electrode material is melted in the alloy process it dissolves a portion of the silicon. At relatively high temperatures solution saturation is reached in a relatively short time such as about three minutes or less. Heating beyond this time does not dissolve any appreciable further quantities of silicon into the electrode. The primary effect of further heating is to permit the diffusion of the electrode material into the solid portion of the wafer. When surface alloying at temperatures near the lower portion of the range, however, the time of heating may be utilized to control the depth of penetration of the electrode because the solution of silicon into the electrode material requires a relatively long time at such lower temperatures to reach saturation. Generally, alloying for about five minutes at relatively low temperatures or for about two minutes at relatively high temperatures is sufficient satisfactorily to alloy the electrode material into the wafer.

The practice of the invention is not limited to the specific electrode composition described heretofore in connection with the prepared embodiment of the invention. Satisfactory but somewhat less advantageous results are provided by other electrode materials comprising by weight from about 30%–90% lead, 70%–10% gold and about ½%–10% of a selected conductivity type-determining impurity based upon the total weight of the lead and gold. Those compositions having a relatively high lead content form electrodes that penetrate relatively less deeply into a silicon wafer, and may be advantageously utilized to form alloy electrodes upon relatively thin wafers such as those .001" thick where minimum penetration is desired. If the lead content is reduced substantially below 30%, however, the material of the formed electrode is relatively brittle and is subject to similar objections and difficulties as electrodes consisting principally of gold and silicon. Varying the lead content of the electrode, therefore, provides an additional means for controlling the depth of penetration of the electrode into the wafer during the alloy process.

Electrode materials according to the invention may also be utilized to make devices other than the specific n-p-n transistor heretofore described. For example, when lead and gold are used as a carrier mixture for an n-type impurity they may be alloyed upon n-type semi-conductive silicon as well as upon p-type semi-conductive silicon. In the latter case a p-n rectifying junction is formed in the silicon adjacent to the electrode, while in the former case an $n_{+}$-n junction is formed. Lead and gold may also be utilized as a carrier for a p-type conductivity determining impurity, with less advantage, however, because the p-type impurities themselves are relatively soft and may be readily surface alloyed to silicon without the use of a carrier.

There have thus been described improved silicon semiconductor devices and methods of making them by surface alloying to silicon bodies selected conductivity type-determining impurities in a solution of lead and gold.

What is claimed is:

1. The method of making a semiconductor device comprising placing a body consisting essentially of lead and a selected donor impurity upon a surface of a body of semiconductive silicon, superimposing a body of gold upon said lead body, the weight proportion of said lead body to said gold body being between 3 to 7 and 9 to 1 and said impurity being present in a quantity of about ½%–10% by weight based on the total weight of said lead and gold, and heating all said bodies together at about 500°–900° C. for at least one minute to alloy said lead, gold and said impurity to said silicon body thereby to form a rectifying barrier in said silicon body.

2. The method according to claim 1 in which said conductivity type-determining impurity is selected from the group consisting of antimony, arsenic and bismuth.

3. The method of making a semiconductor device comprising placing a body consisting essentially of lead and a selected donor impurity upon a surface of a body of semiconductive silicon, superimposing a body of gold upon said lead body, the weight proportion of said lead to said gold being about 6 to 4 and said impurity being present in a concentration of about 2 wgt. % based on the total weight of said lead, and heating all said bodies together at about 500°–900° C. for at least one minute to alloy said lead, gold and said impurity to said silicon body thereby to form a rectifying barrier in said silicon body.

4. A semi-conductor device including a base member of p-type semi-conductive silicon and a rectifying electrode surface alloyed to said base member, said electrode consisting essentially of lead, gold, silicon and a selected conductivity type-determining impurity, said lead and said gold being present in a weight proportion between 3 to 7 and 9 to 1 and said impurity being present in a quantity of ½%–10% by weight based on the total weight of said lead and gold.

5. A semi-conductor device according to claim 4 in which said impurity is at least one element selected from the group consisting of antimony, arsenic and bismuth.

6. A semi-conductor device comprising a body of semi-conductive silicon and an electrode in which said electrode consists essentially of an alloy of about 30%–90% lead by weight, 10%–70% gold by weight, and ½%–10% by weight of a donor impurity selected from the group consisting of arsenic, phosphorus, and antimony based on the total weight of the combined lead and gold.

7. A semi-conductor device according to claim 6 in which said electrode consists essentially of an alloy of about 60% lead by weight, 40% gold by weight, and ½%–10% by weight of said donor impurity based on the total weight of said lead and gold.

8. A semi-conductor device according to claim 6 in which said selected conductivity-type-determining impurity is arsenic.

References Cited in the file of this patent

UNITED STATES PATENTS

| | | |
|---|---|---|
| 2,644,852 | Dunlap | July 7, 1953 |
| 2,649,368 | Smith | Aug. 18, 1953 |
| 2,691,577 | Lark-Horovitz | Oct. 12, 1954 |
| 2,694,024 | Bond | Nov. 9, 1954 |
| 2,701,326 | Pfann | Feb. 1, 1955 |

OTHER REFERENCES

Armstrong: Proceedings of I. R. E. No. 11, vol. 40, November 1952, pages 1341 and 1342.

Bell: Transistor Technology published by Bell Telephone Laboratories Inc. Published July 27, 1953. Printed September 1952. Page 389.